United States Patent [19]

Shean

[11] 4,143,460
[45] Mar. 13, 1979

[54] CHAIN SAW GUARD

[76] Inventor: Robert W. Shean, 158 Dickenson Rd., West Webster, N.Y. 14580

[21] Appl. No.: 879,979

[22] Filed: Feb. 22, 1978

[51] Int. Cl.² ............................................ B27B 17/02
[52] U.S. Cl. ....................................... 30/382; 30/151; 30/371
[58] Field of Search .................. 30/151, 381, 382, 371

[56] References Cited

U.S. PATENT DOCUMENTS

| | | | |
|---|---|---|---|
| 2,638,944 | 5/1953 | Woleslagle | 30/371 |
| 2,937,673 | 5/1960 | Duperron | 30/382 X |
| 3,754,328 | 8/1973 | Knerr | 30/382 |
| 3,808,684 | 5/1974 | Ludwig | 30/382 |
| 4,063,358 | 12/1977 | Hodge | 30/371 |

*Primary Examiner*—Jimmy C. Peters
*Attorney, Agent, or Firm*—Martin LuKacher

[57] ABSTRACT

A guard for the saw chain of a chain saw is provided by a group of "U" shaped channel members which are disposed in telescoping relationship over the upper reach of the saw chain and another group of similar channel members which are disposed in telescoping relationship over the lower reach of the saw chain. The channel members are captured and retained in the contour plate around which the saw chain is entrained. Snap-out buttons limit the maximum extension of the telescoping sections. Arrangements of springs urge the telescoping sections forwardly so that they extend over the saw chains. The snap-out buttons also provide bias in addition to that provided by the springs against retraction. Bars are pivotally mounted on the forwardmost of the channel members. These bars pivot against stops when they engage the log or other work to be sawed. The force applied to the telescoping sections through the bars retract the sections and gradually exposes the saw chain.

10 Claims, 7 Drawing Figures

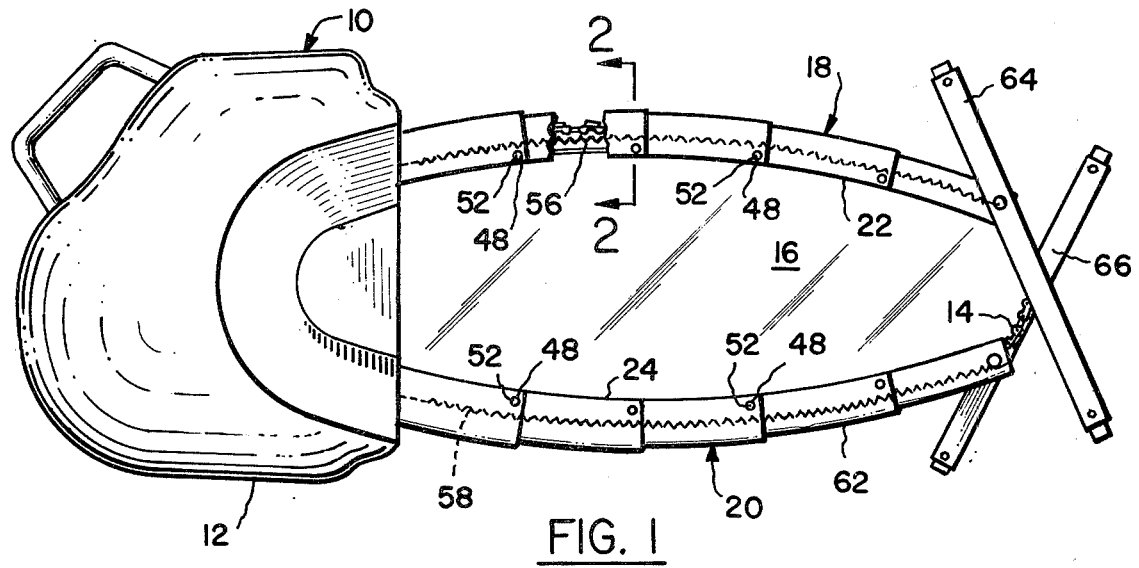
FIG. 1
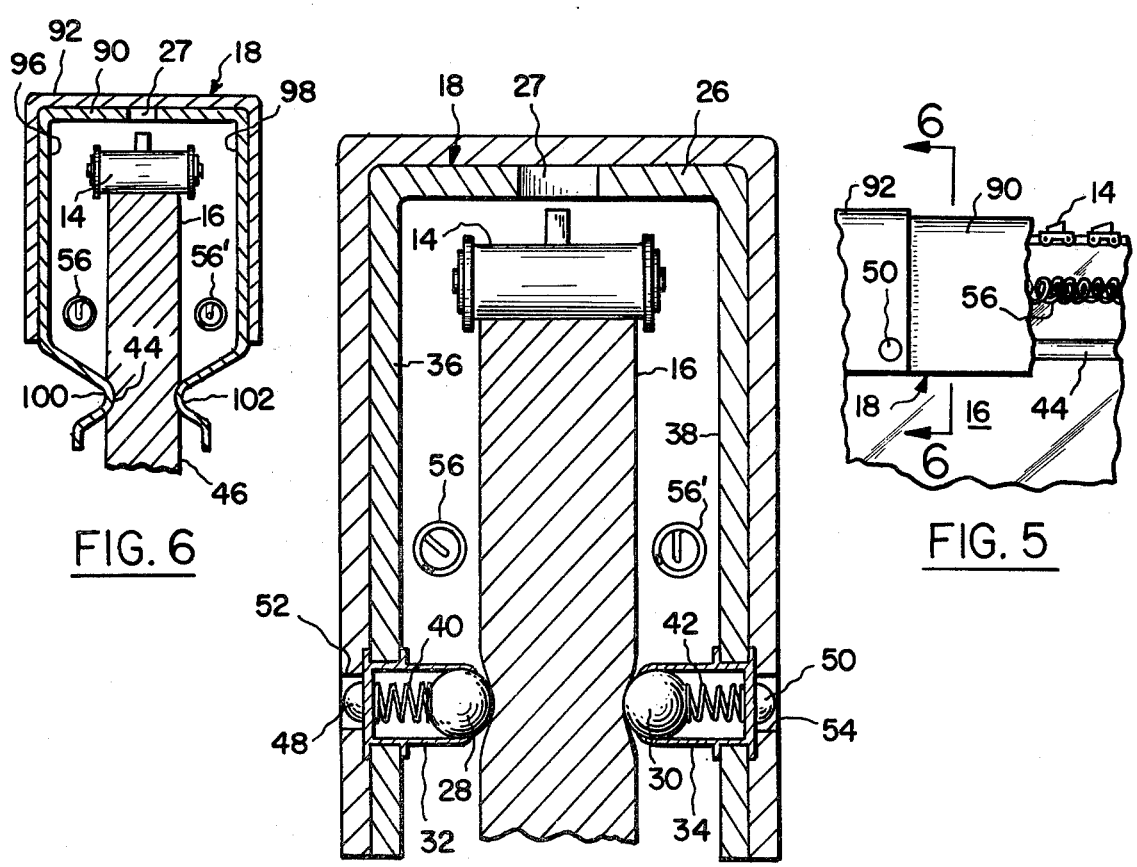
FIG. 6
FIG. 5
FIG. 2

CHAIN SAW GUARD

The present invention relates to improvements in chain saws and particularly to a chain saw having an improved guard mechanism for protecting the saw chain against exposure except while a log or other work is actually being cut, and only in the region of the chain actually doing the cutting.

The invention is especially suitable for use in a chain saw of the type wherein the motor, either electric or gasoline powered, is mounted at one end of the chain which is supported from the housing as a cantilever. The invention however is also adapted for use in chain saws of the type where the motor is disposed centrally of the chain (i.e., a two-man saw).

Concern for the safety of the chain saw user has prompted the development of guards of various types. In U.S. Pat. No. 2,638,944, issued May 19, 1953, a telescoping sheath for covering the entire chain is proposed. The mechanism is complex and adds considerably to the weight of the chain saw. Pivotal guards which also cover the entire chain mechanism are proposed in U.S. Pat. No. 2,937,673 issued May 24, 1960, and U.S. Pat. No. 3,059,673 issued Oct. 23, 1962. These pivotal guards also add substantially to the weight of the saw and require separate controls for their manipulation. Also the pivotal guard can catch on a tree limb or other obstruction; adding to instead of safeguarding against possible accident.

It is a feature of this invention to provide a guard mechanism which increases substantially neither the weight nor the form factor of the chain saw and which may be implemented into existing chain saws with little, if any, redesign or modification thereof.

It is another feature of the invention to provide an improved guard mechanism which covers and protects the saw chain of the chain saw, exposing only so much of the chain as is necessary while the work is actually being sawed.

It is another feature of the invention to provide an improved guard mechanism in which the disadvantages of mechanisms heretofore proposed are substantially eliminated and in which the weight and form factor of the saw is not substantially increased.

Briefly described, a chain saw guard mechanism embodying the invention utilizes the contour plate over which the saw chain is entrained as a support and guide for the guard, thus avoiding the use of sheaths for covering the entire saw chain and not materially increasing the weight of the chain saw even though it is completely guarded. The mechanism uses first and second pluralities of generally "U" shaped channel members which are disposed over the saw chain along the upper and lower reaches of the chain. The channel members of each plurality or section are disposed in telescoping relationship with each other. Springs bias the sections toward the forward end of the contour plate to extend the sections to cover the saw chain. Pivotal members are disposed from the forwardmost channel members of each section. These members are engageable with the log of other work to be sawed for overcoming the bias of the spring and retracting the channel members rearwardly to gradually expose the saw chain as the work is being sawed. The contour plate is preferably formed with guiding grooves along the upper and lower reaches. Guide members extend inwardly from the opposite sides of the channel members and are captured in these guiding grooves which retain and position the channel members as they ride forwardly and rearwardly along the upper and lower reaches of the saw chain.

The foregoing and other objects and advantages of the invention as well as presently preferred embodiments thereof will be more apparent from a reading of the following description in connection with the accompanying drawings in which:

FIG. 1 is a side view of a chain saw equipped with a guard mechanism embodying the invention;

FIG. 2 is a fragmentary sectional view taken along the line 2—2 in FIG. 1;

FIG. 5 is a fragmentary side view showing the design of channel members of a guard mechanism in accordance with another embodiment of the invention;

FIG. 6 is a fragmentary sectional view taken along the line 7—7 in FIG. 6; and

Figure 3:
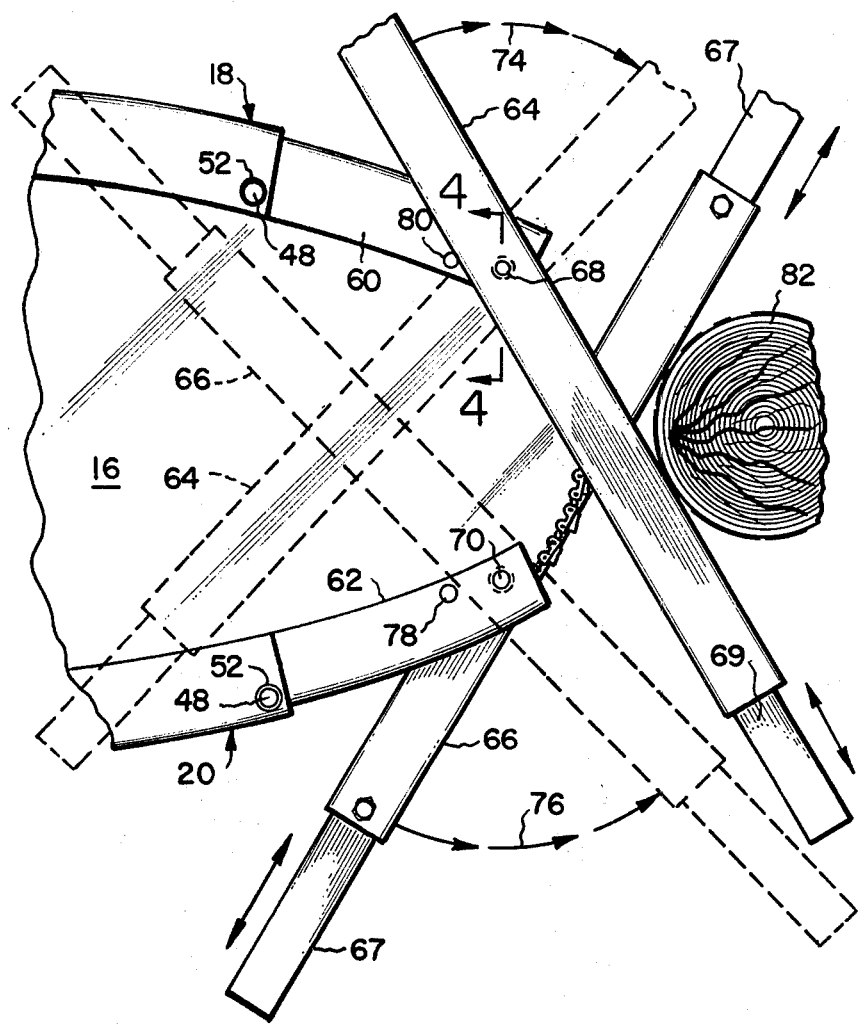
FIG. 3 is an enlarged diagrammatic view of the forward end of the chain saw showing the pivotal members which are mounted at the forward end as they engage a log which is to to cut.

Referring more particularly to FIGS. 1 and 2, there is shown a chain saw 10 having a housing 12 in which is contained the motor, either electric or gasoline driven, of the saw and the sprockets and other mechanism (viz. sprockets and drives) for driving the saw chain 14 around a contour plate 16 on which it is entrained. A first plurality of section of "U" shaped channel members 18 is located along the upper reach of the saw chain 14. A second plurality or section of "U" shaped channel members 20 is disposed along a lower reach of the saw chain 14. The channel members of each of these sections 18 and 20 are of successively increasing size and they are slidably disposed with respect to each other in telescoping relationship. The heights of each member and their widths differ. The base lines 22 and 24 of the sections 18 and 20 are maintained the same. While the members of the sections 18 and 20 are shown progressively decreasing in size from the rearward to the forward end thereof, this may be reversed and the larger sections may be nearer the forward end when the sections are in extended position as shown in FIG. 1.

As shown in FIG. 2, which is a sectional view through a typical one of the channel members 26, each of the members is provided with ball bearings 28 and 30 which are mounted in tubular receptacles 32 and 34 extending inwardly from the side walls 36 and 38 thereof. These ball bearings 28 and 30 are biased by means of springs 40 and 42 into grooves 44 and 46 on opposite sides of the contour plate 16. The balls 28 and 30 are thus captured and retained in the grooves. The arrangement provides for guidance of the channel members in each of the sections 18 and 20 as they ride forwardly and rearwardly along the upper and lower reaches of the saw chain 14. Slots 27 in the channel members 26 allow sawdust to fall clear of the channels.

The side walls 36 and 38 of the channel member 26 are provided with buttons 48 and 50 which are hemispherically shaped protuberances. When the channel members are in extended position as shown in FIGS. 1 and 2, the buttons 48 and 50, due to the flexibility of the side wall of the channel members, snap into holes 52 and 54 in their next adjacent channel members. This arrangement insures that the guard sections 18 and 20 remain in extended position until sufficient force as is exerted during actual sawing operations, is applied to retract the sections 18 and 20.

The sections 18 and 20 are biased in the forward direction by means of pairs of long coil compression springs 56 and 58. Two springs, such as 56 and 56', are mounted within the guard sections between the side walls of the contour plate 16 and the side walls of each of the channel members. The forward end of each of these springs 56 and 58 is attached to the forwardmost of the channel members 60 and 62. The other end of these springs is attached fixedly as to the housing 12. As the sections 18 and 20 are telescoped rearwardly, a spring force in the forward direction develops on these springs 56 and 58 which urges and biases the sections forwardly to the position shown in FIG. 1.

Members 64 and 66 which are in the form of bars are pivotally mounted on the forwardmost channel members 60 and 62. The bar 64 is on one side of the contour plate 16 and the bar 66 is on the opposite side thereof.

Figure 4:
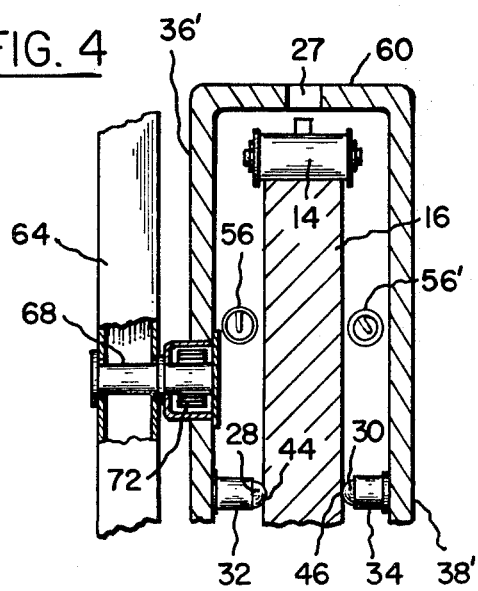
FIG. 4 is a fragmentary sectional view along the line 4—4 in FIG. 3.

As shown in FIGS. 3 and 4, shafts 68 and 70 on which the bars 64 and 66 are mounted are rotatably mounted in the side walls 36' of the forwardmost channel member 60, and of course in the side wall of the forwardmost channel member 62 in the section 20 which corresponds to the side wall 38'. A helical spring 72 biases the bar 64 to rotate in the direction of the arrows 74. A similar spring around the shaft 70 biases the bar to rotate in the opposite sense as shown by the arrows 76. In response to the bias of the springs 72 the bars 64 and 68 will rotate until they meet stubs 78 and 80 which provides stops limiting their movement such that the bars disposed normally out in front of the forward end of the chain saw in the position shown in full lines in FIG. 3.

When, however, a work piece such as a log 82 is actually to be cut, the force exerted by the operator causes the bars 64 and 66 to pivot in a sense opposite to that shown by the arrows 74 and 76 until they assume the position shown in dash lines against the stop 78 and 80. Continued application of sawing force by the operator will counteract the bias of the springs 56 and 58 and allow the buttons 48 to snap out of their holes 52. The channel members of the sections 18 and 20 will then be retracted one at a time exposing the saw chain so as to enable the log 82 to be cut. As shown in FIG. 3 the bars 64 and 66 may be provided with extensions 67 and 69, which may be positioned by means of set screws in order to accommodate various sized logs or other work.

Referring to FIGS. 5 and 6, where parts like those shown in FIG. 1 through 4 are identified with like reference numerals, it will be seen that the channel members 90, 92, etc, have their side walls 96 and 98 bent inwardly so as to form hairpin bends 100 and 102. These bends provide shoulders which, due to the flexible and resilient material (e.g., steel) of which the channel members are formed, are spring biased into the grooves 44 and 46. The channel members thus ride in the grooves. The structure of the channel members offers additional simplification and reduction in the number of parts over that shown in FIG. 2.

Figure 7:
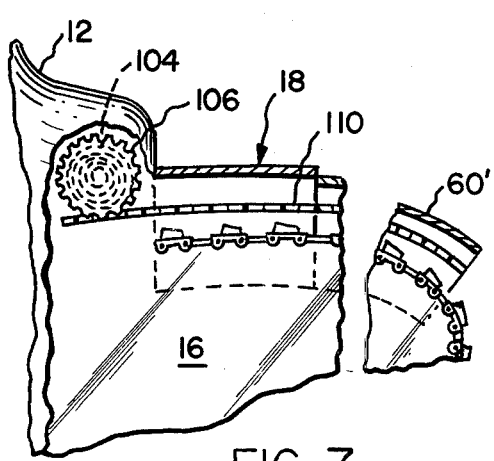
FIG. 7 is a fragmentary sectional side view of a chain saw equipped with a guard mechanism in accordance with still another embodiment of the invention.

Instead of compression springs, spring motors 104 may be used for biasing the sections 18 and 20 in the forward direction to bring them normally to extended position. FIG. 7 shows one of these motors 104 which may contain a flat helical spring as shown by the dash line. The spring is connected to a sprocket 106 which is in engagement with sprocket holes 108 in a rigid strip or band 110. This band is attached to the forwardmost channel member 60'. As the sections 18 and 20 are retracted the strip 100 rotates the sprocket 106 and winds the spring 104. The wound spring exerts a bias force through the sprocket 106 and to the forwardmost channel member 60' for urging the channel members in the forward direction.

From the foregoing description it will be apparent that there has been provided an improved chain saw having an improved guard mechanism. Variations and modifications within the scope of the invention will undoubtedly suggest themselves to those skilled in the art. For example, in a two-man chain saw four sections of telescoping channel members may be provided which come together in the center of the upper and lower reaches of the saw chain. Two sets of bars may be provided, one set for each pair of sections. Other variations and modifications will undoubtedly suggest themselves to those skilled in the art. Accordingly, the foregoing description should be taken as illustrative and not in any limiting sense.

What is claimed is:

1. In a chain saw having a contour plate which defines a path over which a continuous saw chain in driven along upper and lower reaches and between forward and rearward ends of said plate, a guard mechanism which comprises first and second pluralities of U-shaped channel members disposed over said saw chain along the upper and lower reaches of the saw chain path, said first plurality of channel members being disposed in telescoping relationship with each other, said second plurality of channel members also being disposed in telescoping relationship with each other, spring means for biasing said first and second pluralities of telescoping channel members toward the forward end of said plate to extend said first and second pluralities of telescoping members to cover said saw chain, and pivotal members disposed on the ones of said first and second pluralities of channel members at the forward ends of said pluralities of channel members and engageable with the work to be sawed for overcoming the bias of said spring means and retracting said pluralities of channel members rearwardly to expose said saw chain as said work is sawed.

2. The invention as set forth in claim 1 wherein said contour plate has guiding grooves along said upper and lower reaches, guide members extending inwardly from opposite sides of said channel members and captured in said guiding grooves for retaining and positioning said channel members in said plates.

3. The invention as set forth in claim 2 wherein said guide members include spring means biasing said guide members into said grooves.

4. The invention as set forth in claim 3 wherein said guide members comprise a plurality of tubes, each extending inwardly from the sides of said channel members into proximate relationship with said contour plate, ball bearings in said tubes, and said spring means being springs in said tubes biasing said ball bearings outwardly from the ends of said tubes into said grooves.

5. The invention as set forth in claim 3 wherein said guide members are provided by the sides of said channel members, said sides being flexural members, the free ends of which are bent inwardly to define shoulders partially semicylindrical in shape, said semi-cylindrical shoulders being spring biased into said grooves.

6. The invention as set forth in claim 3 wherein each of said channel members have holes in the side walls thereof near the forward ends thereof, said holes being open at the insides of said side walls and buttons in said holes extending from the outside of said holes for snapping into said holes for retaining said channel members in extended position.

7. The invention as set forth in claim 6 wherein said spring means for biasing said telescoping members forwardly comprises at least one compression spring mounted to the housing of said chain saw and means for compressing said spring in response to the movement of said pluralities of telescoping channel members when said members are moved in the rearward direction such that said spring urges said pluralities of telescoping channel members forwardly.

8. The invention as set forth in claim 6 wherein said spring means comprises flat helical springs mounted to the housing of said chain saw, strips of substantially rigid material attached to a forwardmost channel member of each said pluralities of channel members, and means coupling said strips to said helical springs for winding said springs when said pluralities of channel members are moved rearwardly and telescope together such that said helical springs urge said pluralities of channel members forwardly into extended position in which said saw chain is guarded.

9. The invention as set forth in claim 1 wherein said pivotal members are bars mounted for rotation in planes on opposite sides of the path of said saw chain, means for biasing said bars to rotate in opposite senses so that they are disposed in crossed relationship forwardly of said saw chain, and means for limiting the rotation of said bars in senses opposite to the senses in which they are biased to rotate whereby said work is permitted to apply forces to said pluralities of channel members for moving them rearwardly to expose the reaches of said saw chain.

10. The invention as set forth in claim 9 wherein first and second shafts are mounted on forwardmost channel members of said first plurality of channel members and said second plurality of channel members, said first and second shafts being mounted on and extending outwardly from the sides of said channel members which are adjacent opposite sides of said contour plate, one of said bars being pivotally mounted on said first shaft, the other of said bars being pivotally mounted on said second shaft, springs attached to said bars shafts for biasing said bars in said opposite senses, and stops mounted on said channel member sides spaced rearwardly from said shafts and extending in the same direction as said shafts for limiting the rotation of said bars.

* * * * *